United States Patent [19]
Simons

[11] Patent Number: 5,582,913
[45] Date of Patent: Dec. 10, 1996

[54] POLYESTER/POLYAMIDE COMPOSITE FIBER

[75] Inventor: F. Holmes Simons, Charlotte, N.C.

[73] Assignee: Hoechst Celanese Corporation, Somerville, N.J.

[21] Appl. No.: 518,627

[22] Filed: Aug. 23, 1995

[51] Int. Cl.$^6$ .................................................. D02G 3/00
[52] U.S. Cl. ...................... 428/373; 428/374; 428/370; 525/425
[58] Field of Search ............................ 428/370, 373, 428/374; 525/425

[56] References Cited

U.S. PATENT DOCUMENTS

| | | | |
|---|---|---|---|
| 3,378,056 | 4/1968 | Robertson | 525/425 |
| 3,447,308 | 6/1969 | van Drunen | 428/373 |
| 3,458,390 | 7/1969 | Ando et al. | 428/373 |
| 3,489,641 | 1/1970 | Harcolinski et al. | 428/373 |
| 3,492,368 | 1/1970 | Coover, Jr. et al. | 525/425 |
| 3,562,093 | 2/1971 | Griffiths et al. | 525/425 |
| 3,686,069 | 8/1972 | Winkler et al. | 525/425 |
| 4,143,424 | 3/1979 | Knoke et al. | 2/255 |
| 4,409,372 | 10/1983 | Ward et al. | 525/425 |
| 4,457,974 | 7/1984 | Summers | 428/373 |
| 4,610,925 | 9/1986 | Bond | 428/368 |
| 5,346,967 | 9/1994 | Clagett et al. | 525/425 |
| 5,366,804 | 11/1994 | Dugan | 428/373 |
| 5,380,477 | 1/1995 | Kent et al. | 264/103 |
| 5,486,410 | 1/1996 | Groeger et al. | 428/283 |

OTHER PUBLICATIONS

"Improved Sheath/Core Adhesion in Biconstituent Fibers via Interface Mixing", Southern, Martin and Baird, *Textile Research Journal*, (Jul. 1980) pp. 411–416, Princeton, NJ.

*Primary Examiner*—Newton Edwards
*Attorney, Agent, or Firm*—Philip P. McCann

[57] ABSTRACT

An improved polyester/polyamide composite fiber is provided. The composite fiber includes a polyamide component generally considered to lack compatibility with a polyester component. Advantageously, the composite fiber includes an adhesion-promoting polymer in an amount effective to provide adhesion of the polyamide component to the polyester component. The composite fiber beneficially provides strength and cost advantages.

14 Claims, 1 Drawing Sheet

POLYESTER/POLYAMIDE COMPOSITE FIBER

FIELD OF THE INVENTION

This invention relates to composite fiber.

BACKGROUND OF THE INVENTION

Polyester/polyamide composite fiber has a problem of separation, also called fibrillation or pre-splitting, between the polyester component and the polyamide component. According to U.S. Pat. No. 3,489,641 to Harcolinski et al, this problem is due to inherent incompatibility, and may be overcome by use of a certain modified polyester. Harcolinski et al describe nylon 6.6, nylon 6, and polyhexamethylene-suberamide as especially suitable polyamides for combination with the modified polyester.

Southern, Martin and Baird, *Textile Research Journal*, pp. 411 (1980) describe improved sheath/core adhesion by the use of interface mixing after forming a composite melt stream. Nylon 6.6 sheath/PET core heterofil is spun. However, this approach is commercially difficult when spinning multiple monofils from a single spinneret.

U.S. Pat. No. 4,610,925 to Bond teaches that a nylon sheath on a polyester core will lack the required sheath/core adhesion. Bond describes avoiding the adhesion problem by using either a nylon core with a sheath made from nylon 11, nylon 12, nylon 6.10 or nylon 6.12, or a polyester core with a sheath made from copolyetherester. Bond provides the sheath/core filament thereof with antistatic characteristics by the addition of 20 to 30 wt. % carbon to the sheath.

U.S. Pat. No. 4,457,974 to Summers teaches the use of polyester substantially free of antimony to overcome pre-splitting, and describes nylon 6.6, nylon 6, and poly(hexamethylene sobacamide) as suitable polyamides for the polyester/polyamide composite fiber. In the Background portion of the patent, summers observes that pre-splitting can be reduced by including aminopropylmorpholine and bis-hexamethylenetriamine in the nylon component.

According to U.S. Pat. No. 5,380,477 to Kent et al, bicomponent spinning will allow two normally incompatible polymers to form strong materials without the use of compatibilizing agents. Kent et al broadly describe a matrix component selected from virtually any thermoplastic material, for instance, polyamides (such as nylon 6, nylon 6.6, nylon 6.6T, nylon 4.6, nylon 8, nylon 6.10, nylon 11 and nylon 12), polyolefins (such as polypropylene, polyethylene, polytetrafluoroethylene and polyphenylene ether), polyesters, polyimides, polysulfones, polyphenylenesulphide, polyvinyls, polyethyleneglycol, styrene-containing copolymers and so forth, and copolymers and blends. The examples teach a bicomponent fiber consisting of a PET core and a nylon 6 sheath, but sheath/core separation during stretching or drawing of this fiber, and in use, is overlooked.

Despite advances in the prior art, there continues to be a need for commercially advantageous, polyester/polyamide composite fiber, and in particular for core/sheath heterofil. While there are polyamides that adhere to polyesters, they are expensive specialty polymers, some also of poor physical properties; thus, a need exists for producing adhesion between polyesters and inexpensive commodity polyamides such as nylon 6 and nylon 6.6, with good physical properties.

SUMMARY OF THE INVENTION

In accordance with the present invention, improved polyester/polyamide composite fiber is provided. The fiber includes a polyamide component generally considered to lack compatibility with a polyester component such as nylon 6 or nylon 6.6, and in addition, an adhesion-promoting polymer in an amount effective to provide adhesion of the polyamide component to the polyester component. The adhesion-promoting polymer is beneficially compatible with the polyamide component so as to be blendable therewith. By the term "polymer" is meant a high molecular weight, chain-like structure formed from monomeric units.

BRIEF DESCRIPTION OF THE DRAWINGS

Reference is now made to the accompanying drawing, which forms a part of the specification of the present invention.

DETAILED DESCRIPTION OF THE INVENTION

Figure 1:
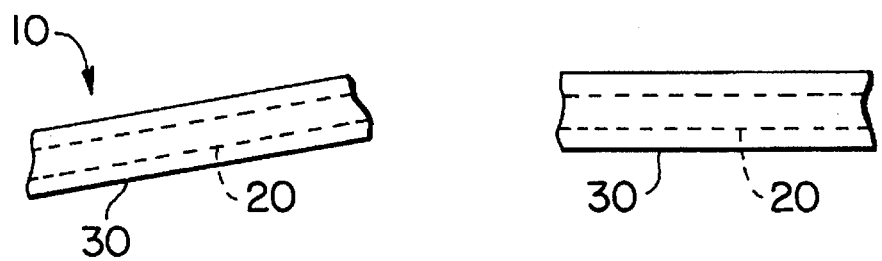
FIG. 1 depicts the clean break observed for the polyester core/polyamide sheath monofilament of Example 1.

According to the present invention, polyester/polyamide composite fiber that makes use of inexpensive commodity polyamides, is provided. The term "fiber" as used herein, refers to a unit of matter that forms the basic elements of fabrics and other textile structures. Non-limiting examples of the foregoing definition are monofilaments, multifilaments, yarns and so forth. The fiber may be monofil or a bondable sewing thread, or may be made into a fabric, for instance, a spunbonded fabric, paper machine clothing, or a reinforcement structure such as a tire reinforcement structure. Beneficially, the fiber has improved strength compared to non-adhering polyester/polyamide composite fiber.

Composite fiber in accordance with the present invention, beneficially includes a polyester component, and in particular polyethylene terephthalate. Other useful polyesters include polybutylene terephthalate. This component beneficially provides characteristics such as strength and dimensional stability to the fiber. Unlike Summers, it is unnecessary for a polyester useful in the present invention, to be free of antimony.

The term "polyethylene terephthalate" as used herein, is used generally to include polymers made by condensing ethylene glycol with terephthalic acid or dimethyl terephthalate, no matter how prepared. Furthermore, this term is meant to include polyethylene terephthalate polymers modified by the inclusion of minor amounts, e.g., less than about 25 percent by weight of the polymer, of conventional co-monomers or modifying agents, as is well known. Such co-monomers or modifying agents include various diols such as 1,4-butanediol, cyclohexanedimethanol, diethylene glycol and 1,3-propanediol. Likewise, such co-monomers or modifying agents may include various aliphatic or aromatic diacids such as isophthalic acid and naphthalene dicarboxylic acid. In addition, this term is meant to include a polyethylene terephthalate polymer blended with a minor amount, e.g., less than about 25 percent by weight, of a polyester such as a polyethylene 2,6-naphthalene dicarboxylate. Accordingly, polyethylene terephthalate homopolymer, a copolymer containing polyethylene terephthalate in a major amount, or a polyester blend containing polyethylene terephthalate in a major amount, is a suitable polyester.

The polyester component may also be a thermotropic LCP, and in particular may be a wholly aromatic polyester. Thermotropic LCPs exist in a liquid-crystalline state above their melting point, are melt processable, and are useful for the manufacture of high strength fiber. By the term "wholly aromatic polyester" as used in connection with this invention, is meant that the polyester backbone is made of aromatic monomers.

Composite fiber in accordance with the present invention, includes a polyamide component generally considered to be inherently incompatible with polyester, such as nylon 6, nylon 6.6 and blends thereof. This type of polyamide will beneficially be a relatively less expensive, commodity polyamide. Polyamides of this type generally have good physical properties such as elongation and tenacity.

The polyamide component may be lower melting than the polyester component. When the polyamide component is relatively lower melting, adhesion to make a self-bonded, fibrous matrix is provided. Whether relatively lower melting or not, improved adhesion of the polyester component to a substrate such as rubber, is provided. As the sheath of sheath/core heterofil, the polyamide component imparts benefits of a nylon surface to the fiber, such as dyeability and abrasion resistance.

In accordance with the present invention, in order to overcome inherent incompatibility with the polyester component, the polyamide component is modified by the inclusion of an adhesion-promoting polymer. Beneficially, the adhesion-promoting polymer is a polyester-adhering polyamide, and is miscible in the melt state with the polyamide component. Particularly useful as the adhesion-promoting polymer are nylon 11, nylon 12, nylon 6.10, nylon 6.12 and blends thereof; however, as may be understood, other adhesion-promoting polymers may be used. This type of polyamide is typically an expensive specialty polymer, and may have poor physical properties.

I have noted that nylon 11, nylon 12, nylon 6.10 and nylon 6.12 each has a melting point less than that of the inherently incompatible polyamide component. While intending not to be bound by any particular theory at this time, it may therefore be that a relatively lower melting point permits the adhesion-promoting polymer to exude to the polyester interface to form a tie layer between the polyester and inherently incompatible polyamide. Beneficially, such a tie layer would be axially generally uniform so as to provide adhesion along the entire polyester interface. Alternatively, it may be that amide interchange in the melt state of a mixture of the inherently incompatible polyamide and the adhering polyamide, results in a block co-polymer with blocks of adhering polyamide in the molecular chain of the non-adhering polyamide. Analysis has indicated some co-polymer formation when nylon 6 and nylon 12 are combined in the melt state.

The amount of the adhesion-promoting polymer in the polyamide component will vary depending upon factors including the particular adhesion-promoting polymer selected, and the desired degree of adhesion to the polyester component. Thus, for greater adhesion, a relatively larger loading will be used, whereas for less adhesion, a relatively smaller loading will be used. This ability to adjust the degree of adhesion can be advantageously used to improve the tear strength of spunbond by having core-sheath separation only when approaching break point.

For economic purposes, the least amount of the adhesion-promoting polymer will usually be used as is consistent with obtaining the desired adhesion. Suitably, about 1 to 50 wt. %, based upon the total weight of the polyamide component including the adhesion-promoting polymer, will be used, with about 5 to 15 wt. % being typical. Accordingly, the incompatible polyamide will be suitably present in an amount, based upon the total weight of the polyamide component including the adhesion-promoting polymer, of about 50 to 99 wt. %, with about 85 to 95 wt. % being typical. In any event, the adhesion-promoting polymer will be present in an amount effective to provide adhesion of the otherwise inherently incompatible polyamide component to the polyester component. As will be understood, the adhesion must be sufficient to prevent separation of the polyester component from the polyamide component during drawing or stretching.

The ratio of the polyester component to the polyamide component including the adhesion-promoting polymer, may vary over wide limits but will, for practical purposes at this point in time, be within the limits of from about 10/90 to 90/10 percent, by volume. Preferably, the ratio will generally range from about 30/70 to 70/30 percent, even more preferably from about 45/55 to 55/45 percent, by volume.

Concentric sheath-core fibers are one example of a suitable composite fiber structure. Suitable composite fiber structures further include eccentric sheath-core and side-by-side configurations. If appropriate, the composite fiber may have a multi-segmented structure. The composite fiber may be in a wide variety of forms including crimped and non-crimped cut staple fibers, short-cut staple and continuous filaments. The composite fiber may be monofil or multifil.

If desired, the polyamide component may include conventional additives. For instance, a pigment may be present in an amount typically in the range of about 0.1 to 2 wt. %.

In accordance with the present invention, the adhesion-promoting polymer is blended with the incompatible polyamide. Blending may be accomplished either in the solid state or liquid state. To this end, a suitable ratio of these starting materials in the solid state may be tumbled in a conventional tumble mixer such as a double cone blender. Generally speaking, any technique that will provide for generally uniform distribution, may be used. Thus, melt streams of the individual starting materials, may be combined.

The composite fiber may be spun in a conventional manner as follows. The polyester component and polyamide component are typically fed to separate extruders, and molten streams issue from the extruders and are passed to metering pumps. Thereafter, the streams are combined in a suitable pack arranged to provide the desired composite structure, and passed through a spinneret, which will have a suitable number of holes for the particular multifil or monofil. After emerging from the spinneret, the composite fiber is attenuated and quenched, and thereafter in solidified form may be stretched or drawn. A particularly suitable heterofil pack is illustrated by U.S. Pat. No. 5,256,050 to Barrie Davies. The composite fiber is then wound on a roll in a conventional manner.

In the specification and Examples including Comparative Examples, all percentages are weight/weight and all processing may generally be considered to be carried out under conventional processing temperatures and under atmospheric pressure, unless indicated otherwise.

EXAMPLE 1

Nylon 6 chips (90 wt. %), commercially available from Allied Signal under the trademark CAPRON, and nylon 12 chips (10 wt. %), commercially available from Atochem under the trademark RZLSAN, are mixed using a tumble mixer for two hours. In preparation for spinning, the polyamide mixture is thereafter dried at 110° C. for 10 hours under full vacuum, and then allowed to cool under nitrogen; and PET chips are similarly subjected to standard drying at 150° C. for 14 hours under full vacuum.

The PET chips are fed to a hopper for a conventional extruder, and molten polymer at a temperature of 285° C. issues from the extruder and is passed to a metering pump (pump speed, 12 rpm; 1.168 cc/revolution). The polyamide chip mixture is fed to a second hopper for a second conventional extruder, and molten polymer blend at a temperature of 275° C. issues from the extruder and is passed to a metering pump (pump speed, 24 rpm; 0.584 cc/revolution). Metering provides 50% polyester and polyamide blend, by volume, to a pack (285° C.) which includes a pair of screens (60 microns) for filtering the individual streams, and arranged to make core/sheath heterofil; and the composite stream is then passed through a spinneret (hole count, 1; hole diameter, 0.050") for forming monofilament. The resultant monofilament is attenuated and water quenched, and thereafter in the solid state is stretched, and then wound onto a roll in a conventional manner. Polyester core/polyamide sheath heterofil is obtained. During the stretching, the polyamide sheath remains adhered to the polyester core. As illustrated in FIG. 1, when tested at break point, the monofilament is found to break cleanly, that is, without separation of core 20 from sheath 30 of fiber 10.

Figure 2:
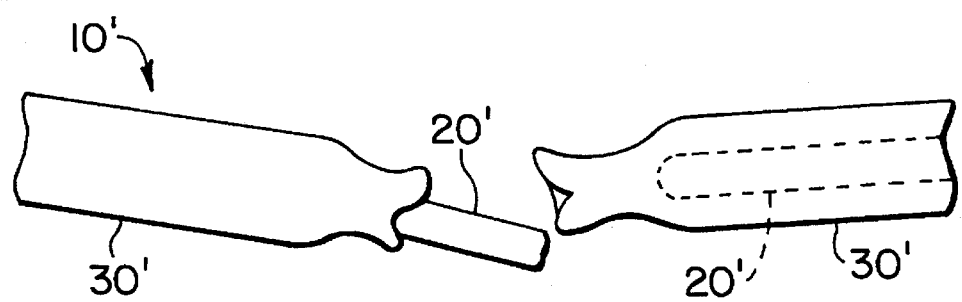
FIG. 2 depicts the sheath/core separation observed when prior art monofilament is tested at break point.

By comparison, the sheath of PET core/nylon 6 sheath heterofil without nylon 12, is found to separate from the core during stretching. In addition, as depicted in FIG. 2, when tested at break point, core 20' and sheath 30' break separately, greatly reducing the strength of composite fiber 10'.

EXAMPLE 2

In a variation, a mixture of chips of 90 wt. % nylon 6 and 10 wt. % nylon 12, is again prepared; and molten PET at a temperature of 278° C. and molten polyamide blend at a temperature of 268° C. issue from the respective extruders, and are passed to metering pumps (50% PET/50% polyamide blend output, by volume), and then to a pack again arranged to make core/sheath heterofil. The pack temperature is 275° to 277° C. The core head temperature is 289° C. As in Example 1, the pack includes no sand, and no interfacial mixing is provided for. Polyester core/polyamide sheath heterofil is obtained.

The heterofil is subjected to a draw ratio of 3.61. Fiber elongation is thereafter determined to be 47.4% and the tenacity to be 3.89 gpd, using standard test procedures. The tensile factor, defined as tenacity x the square root of the elongation, is 26.8.

Polyester core/polyamide sheath (90 wt. %, nylon 6; and 10 wt. %, nylon 12) heterofil obtained as indicated above, is tested for abrasion resistance using the squirrel cage abrasion test. For the test, the speed is 80 cycles/minute, and the tension weight on the monofilament is 50 g. Four strands are tested, and the average value is 2517. The test is repeated for three additional groups of four strands, and the average values are 3734, 3374 and 2473. A relatively higher value shows relatively greater abrasion resistance.

COMPARATIVE EXAMPLE 1

The spinning procedure of Example 2 is followed except as now indicated. Nylon 6.10, a polyester-adhering polyamide commercially available from BASF, is substituted for the polyamide mixture. The elongation and tenacity properties of nylon 6.10 are not as favorable as those of nylon 6, and in addition there is increased cost in using nylon 6.10.

Molten PET at a temperature of 290° C. and molten nylon 6.10 at a temperature of 272° C. issue from the respective extruders. The pack temperature is 286°–287° C. The core head temperature is 302° C. PET core/nylon 6.10 sheath heterofil is obtained.

The heterofil is subjected to a draw ratio of 3.62. Fiber elongation is thereafter determined to be 50.5% and the tenacity to be 3.45 gpd, using the same test procedures as before. The tensile factor is 24.5.

The PET core/nylon 6.10 sheath heterofil is thereafter subjected to the squirrel cage abrasion test following the procedure of Example 2. Four groups of four strands are tested, and the average values of the four groups are 3652, 2019, 3041 and 2312. Comparison, without statistical analysis, indicates that this heterofil is somewhat less abrasion resistant than the heterofil of Example 2.

COMPARATIVE EXAMPLE 2

The spinning procedure of Example 2 is followed except as now indicated. Nylon 6.10 is substituted for the polyamide mixture. Molten PET at a temperature of 281° C. and molten nylon 6.10 at a temperature of 269° C. issue from the respective extruders. The pack temperature is 279°–281° C. The core head temperature is 294° C. PET core/nylon 6.10 sheath heterofil is obtained.

The heterofil is subjected to a draw ratio of 3.62. Fiber elongation is thereafter determined to be 39.1% and the tenacity to be 3.87 gpd, using the same test procedures as before. The tensile factor is 24.2.

Comparison of the tenacity of the fiber of Example 2 with the tenacity of the fibers of the Comparative Examples, reveals better or substantially equivalent tenacity for the polyamide blend sheath of Example 2. This high tenacity value demonstrates good sheath/core adhesion. Comparison of the elongation of the fiber of Example 2 with the elongation of the fibers of the Comparative Examples, reveals an elongation value intermediate to those of the Comparative fibers.

The tensile factor is superior for composite fiber in accordance with the present invention, compared to the composite fibers of the Comparative Examples.

Figure 3:
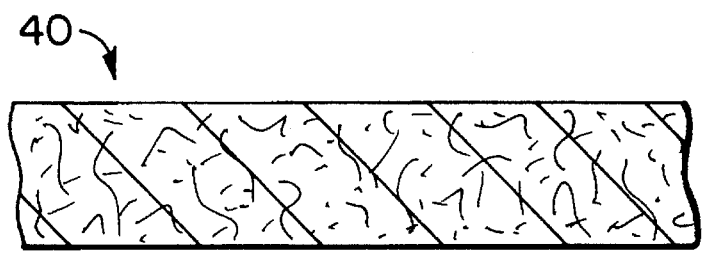
FIG. 3 is a cross-sectional view of a non-woven fabric made from composite fiber in accordance with the present invention.

Polyester/polyamide composite fiber in accordance with the present invention, has a wide variety of useful applications. Illustrative are improved spunbond tear strength, abrasion resistant monofil or multifil, abrasion resistant or heat-bondable sewing thread, and improved tire yarn to rubber adhesion. Thus, with reference to FIG. 3, a useful fabric 40 can be made from the composite fiber. For instance, the fiber can be made into a tire reinforcement structure and adhered to the tire rubber during vulcanization to provide improved adhesion of the polyester to the rubber. Other than the use of a fiber in accordance with the present invention, the processing would be conventional, and thus may include the use of conventional polyamide-to-rubber adhesive.

The present invention may be carried out with various modifications without departing from the spirit or essential attributes thereof, and accordingly, reference should be made to the appended claims, rather than to the foregoing specification as indicating the scope of the invention.

I claim:

1. Polyester/polyamide composite fiber comprising a polyester component and a polyamide component elected from the group consisting of nylon 6, nylon 6,6 and blends thereof, and the polyamide component contains an adhesion-promoting polymer in an amount effective to provide adhesion of the polyamide component to the polyester component.

2. The composite fiber of claim 1, wherein said adhesion-promoting polymer is selected from the group consisting of nylon 11, nylon 12, nylon 6.10, nylon 6.12, and blends thereof.

3. The composite fiber of claim 1, wherein said adhesion-promoting polymer has a melting point less than that of the polyamide component.

4. The composite fiber of claim 1, wherein said polyester component is polyethylene terephthalate.

5. The composite fiber of claim 1, wherein said polyester component and said polyamide component are present in a ratio ranging from about 10/90 to 90/10 percent, by volume.

6. The composite fiber of claim 5, wherein said ratio ranges from about 30/70 to 70/30 percent, by volume.

7. The composite fiber of claim 1, wherein said amount of said adhesion-promoting polymer, based upon the total weight of the polyamide component including the adhesion-promoting polymer, is in the range of about 1 to 50 wt. %.

8. The composite fiber of claim 7, wherein said amount of said adhesion-promoting polymer is in the range of about 5 to 15 wt. %.

9. The composite fiber of claim 1, having a concentric core/sheath structure.

10. The composite fiber of claim 1 in the form of monofilament.

11. Polyester/polyamide composite fiber according to claim 1 wherein the polyester component comprises the core and the polyamide component comprises the sheath of the composite fiber.

12. Polyester/polyamide composite fiber according to claim 1 wherein the polyethylene terephthalate component is selected from the group consisting of 1) polyethylene terephthalate homopolymer, 2) polyethylene terephthalate modified with less than 25%, by weight of the polymer, of a co-monomer or modifying agent selected from the group consisting of 1,4-butanediol, cyclohexanedimethanol, diethylene glycol, 1,3-propanediol, isophthalic acid and naphthalene dicarboxylic acid and 3) polyethylene terephthalate blended with less than 25%, by weight, of polyethylene 2,6-naphthalene dicarboxylate.

13. Polyester/polyamide composite fiber according to claim 1 wherein the adhesion-promoting polymer is nylon 12.

14. Polyester/polyamide composite fiber comprising a polyester component and a polyamide component and produced by blending 1) nylon 6, nylon 6.6 or a blend thereof with 2) an amount of an adhesion-promoting polymer effective to provide adhesion of the polyamide component to the polyester component and spinning the composite fiber from the polyester component and the blend of 1) and 2).

* * * * *